US012583006B2

(12) United States Patent
Roussell

(10) Patent No.: US 12,583,006 B2
(45) Date of Patent: Mar. 24, 2026

(54) BLOW OFF COVER FOR A NOZZLE

(71) Applicant: Michael Peter Roussell, Craftsbury Common, VT (US)

(72) Inventor: Michael Peter Roussell, Craftsbury Common, VT (US)

( * ) Notice: Subject to any disclaimer, the term of this patent is extended or adjusted under 35 U.S.C. 154(b) by 205 days.

(21) Appl. No.: 18/665,841

(22) Filed: May 16, 2024

(65) Prior Publication Data

US 2024/0382992 A1 Nov. 21, 2024

Related U.S. Application Data

(60) Provisional application No. 63/467,192, filed on May 17, 2023.

(51) Int. Cl.
*B05B 12/00* (2018.01)
*A62C 13/76* (2006.01)

(52) U.S. Cl.
CPC ............ *B05B 12/002* (2013.01); *A62C 13/76* (2013.01)

(58) Field of Classification Search
CPC ....... B05B 12/002; B05B 15/50; B05B 15/16; B05B 1/3006; A62C 13/76; A62C 31/28; A62C 31/02; A62C 35/023; A62C 13/66
See application file for complete search history.

(56) References Cited

U.S. PATENT DOCUMENTS

| | | | | | |
|---|---|---|---|---|---|
| 2,148,535 | A | | 2/1939 | Cone | |
| 5,845,716 | A | * | 12/1998 | Birk | A62C 35/023 239/405 |
| 6,158,522 | A | * | 12/2000 | Laderoute | A62C 31/02 239/71 |
| 7,389,827 | B2 | | 6/2008 | Biehl | |
| 10,350,442 | B2 | | 7/2019 | Kronebusch | |
| 10,569,113 | B2 | * | 2/2020 | Morgan | A62C 31/28 |

FOREIGN PATENT DOCUMENTS

| | | | | | |
|---|---|---|---|---|---|
| EP | 1883459 | B1 | | 3/2014 | |
| WO | WO-2005113153 | A1 | * | 12/2005 | B05B 15/50 |

* cited by examiner

*Primary Examiner* — Steven M Cernoch
(74) *Attorney, Agent, or Firm* — Downs Rachlin Martin PLLC

(57) ABSTRACT

A covering is provided to protect nozzles from outdoor elements while allowing the nozzle to discharge fluid when needed. The covering includes a water way portion with a cap, a lock ring, a clamp, and a flexible collar, and may also include a body cover attached to the water way portion and extending over the body of the nozzle. The cap is configured to cover the water way of the nozzle and is attached such that when pressure is applied from the water way, the cap is released allowing water to flow from the nozzle. The cap may then be reattached to the collar when the nozzle is not is use. In this way, the cover protects and covers fire nozzles up to the moment that the equipment is activated.

19 Claims, 7 Drawing Sheets

BLOW OFF COVER FOR A NOZZLE

RELATED APPLICATION

This applications claims the benefit of priority to U.S. Provisional Application No. 63/467,192, filed May 17, 2023, and titled "Weatherproof fire equipment covers which allows fire equipment to activate and function while still remaining covered", which is incorporated by reference herein in its entirety.

FIELD

The present disclosure generally relates to fire suppression equipment and more particularly to a blow off cover for a nozzle.

BACKGROUND

For fire suppression, in some locations and facilities pre-positioned fixed fire monitors are used that, in case of fire or explosion, automatically turn on and include nozzles that are aimed at a location to extinguish the fire. Fixed position fire monitors are typically located in high overlooking positions or scattered throughout a field of storage tanks that are holding flammable fluids or gas, many of them facing upward in orientation or high on top of trucks. Being mounted in such difficult to reach locations they are usually uncovered because it is difficult to remove a protective covering, especially within the timeframe and under the circumstances when they are needed. As a result, these nozzles may be exposed to the elements for long periods, including UV radiation, rain, snow, and ice. This exposure can degrade the life expectancy of the equipment and cause the equipment to be in questionable operational readiness.

SUMMARY

A protection system for a nozzle having a body with an inlet end and a discharge end with an opening. A first collar is sized and configured to fit around a portion of the body at the discharge end, a second collar is sized and configured to fit over the discharge end and at least a portion of the first collar and engage with the first collar when the first collar is on the body, a securing device is sized to fit around the first collar when the flexible collar is on the body and configured to tighten the first collar onto the body, and a cap is sized and configured to cover the opening and be releasably attached to the second collar and to disengage from the second collar when a threshold pressure is exerted on a nozzle-facing surface of the cap from the discharge end. The second collar is configured to remain attached to the body when the cap disengages when the threshold pressure is exerted.

A protection system for a nozzle having a body with an inlet end and a discharge end with an opening, the opening including an outer nozzle opening surface having an outer diameter, that includes a flexible collar sized and configured to fit around a portion of the body at the discharge end and including a collar engagement member on an end facing the discharge end when the flexible collar is on the body. A lock ring is sized and configured to fit over the discharge end and a portion of the flexible collar, the lock ring including a receptor configured to receive the collar engagement member. A clamp is sized to fit around the flexible collar when the flexible collar is on the body and configured to tighten the flexible collar onto the body. A cap is sized and configured to cover the opening and be releasably attached to the lock ring and disengage from the lock ring when a threshold pressure is exerted on a nozzle-facing surface of the cap from the discharge end. The lock ring is configured to remain attached to the body when the cap disengages when the threshold pressure is exerted.

A method of protecting a nozzle having a body with an inlet end and a discharge end with an opening, the opening including an outer nozzle opening surface having an outer diameter includes placing a flexible collar around a portion of the body at the discharge end, wherein the flexible collar includes a collar engagement member on an end facing the discharge end, placing a lock ring over the discharge end and a portion of the flexible collar, wherein the lock ring includes a receptor that engages with the collar engagement member, tightening a clamp around the flexible collar such that the flexible collar is secured to the body, and attaching a cap to the lock ring. The cap covers the opening and is attached to the lock ring such that the cap disengages from the lock ring when a threshold pressure is exerted from the discharge end on a nozzle-facing surface of the cap and the lock ring is configured to remain attached to the body when the cap disengages when the threshold pressure is exerted.

BRIEF DESCRIPTION OF THE DRAWINGS

For the purpose of illustration, the accompanying drawings show aspects of one or more embodiments of the disclosure. However, it should be understood that the scope of this disclosure is/are not limited to the precise arrangements and instrumentalities shown in the drawings, wherein.

DETAILED DESCRIPTION

Figure 2:
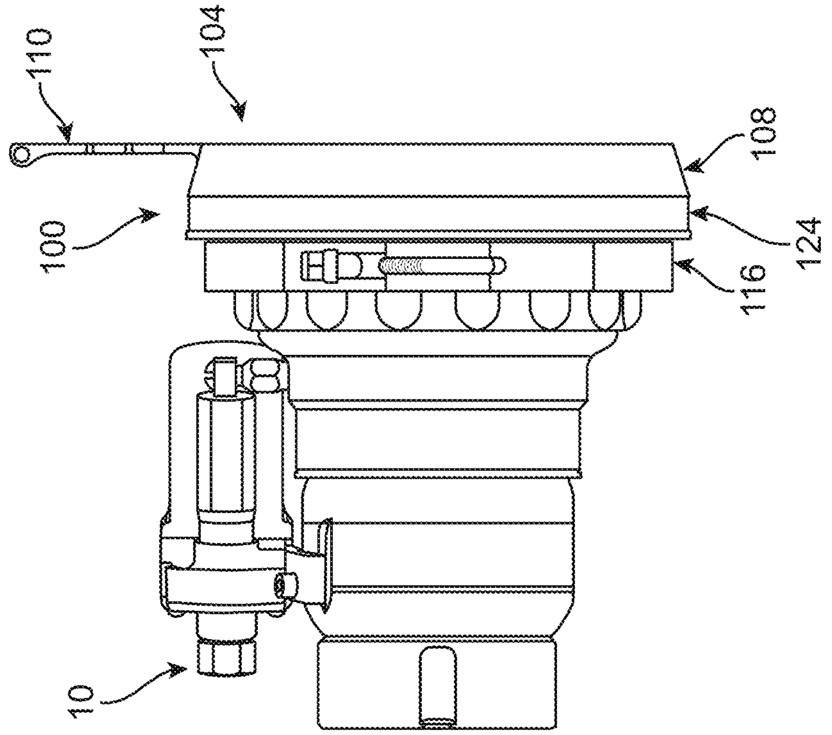
FIGS. 2 and 3A are side views of a nozzle with a protective covering for the water way or discharge end of the nozzle in accordance with an embodiment of the present disclosure.

A protective covering is provided to protect nozzles (as used herein including any device for discharging fluids or foams, such as spouts, spigots etc.) that includes a water way portion that has a cap, a lock ring, a clamp, and a flexible collar. Additionally or alternatively, a body cover may be included that is attached to the water way portion and extends over the body of the nozzle. The cap is configured to cover the water way of the nozzle and is attached to the lock ring, which is secured to the nozzle, such that when pressure is applied from the water way, the cap is released from the lock ring, allowing water to flow from the nozzle. The cap may then be reattached to the collar when the nozzle is no longer discharging.

In an embodiment, the cap may be made of high visibility vinyl with a reflective coating applied to the exterior to facilitate inspection for orientation of the nozzle. This protects and covers fire nozzles up to the moment that the equipment is activated. Upon activation of the nozzle, the front cap of the cover blows off due to the equipment's own air and water pressure, allowing the equipment to function. For example, nozzles may discharge at a rate of 500 to 1250 GPM, which generates sufficient force to blow the cap off. After the nozzle is no longer discharging water, the cap can be placed back on the face of the cover to provide protection to the water way again.

In an embodiment, the spray nozzle may also be covered with a waterproof, UV resistant material, which may be secured to the nozzle in any suitable manner including via drawstring choke channels sewn into the body of the cover so that it is possible to cinch the body of the cover tightly on to the nozzle. The cover cap of the nozzle cover may be attached to the body of the cover with sewn in hook and loop strips that hold the front cap end of the cover together until the fire equipment is activated. Once activated, the air and water pressure of the nozzle blows the cap of the cover off, allowing the nozzle to spray. In the case of remotely operated nozzle equipment, the cover in operational mode allows for the full operation of the nozzle without hindrance while at the same time remains fully covered except for the blow off cap which dangles from the lease tether until the equipment is ready to store again.

In one embodiment, the protective cover is made by assembling three sections, a cap, an upper body, and a body to form the cover. The cap may be made by cutting a circular shaped piece of vinyl and a strip of vinyl and sewing the strip of vinyl on to the outside circumference of the circle. A strip of wide hock hook and loop is sewn into the inside edge of the cap. A double strand of shock cord is sewn onto the outside edge of the strap cap. The upper body is formed by cutting a rectangular shaped piece of 1000 Denier Ballistic and placing it over a similar sized piece of vinyl then sewing them together. The two plies are folded over and top stitched together in such a way that the vinyl is folded inside forming 4-layer strip rectangle which has an exterior of ballistic a 2-ply interior of vinyl. The thick rubber gasket is sewn into the interior side of the upper body of the cover. This rubber gasket is sewn onto the 4 ply rectangles 3⁄16 down from the folded outside rime of the upper body. A piece of ¼ wide loop of hook and loop fastener material is sewn from the folded edge of the upper body section of the cover. A rectangular piece of 70 Denier rip stop fabric is cut to a 3-wide strip of light weight rip stops and a channel is stitched for the cinch choke position midway into the body of the cover sewing in the shock cord and placing the plastic choke clip in the center of the channel. Another channel is added at the bottom of the cover. Three pleat fold positions are added in the body one at center then one on each side centered.

In operation, the cover is placed over the fire equipment's nozzle and cinched down snugly and anchored with a bungee cord or similar. The blow off cap is placed on to the face of the cover. When the nozzle is activated, the water is turned on and the pressure from the water following thru the nozzle will blow the cap of the cover off and out of the way of operation allowing the use of the nozzle.

A grommet tab with carabiner clip attached to the cover base which allows the cover to be tethered and anchored to the fire apparatus so that the cover itself can never blow off the firefighting equipment while the nozzle while it is in use.

Figure 1:
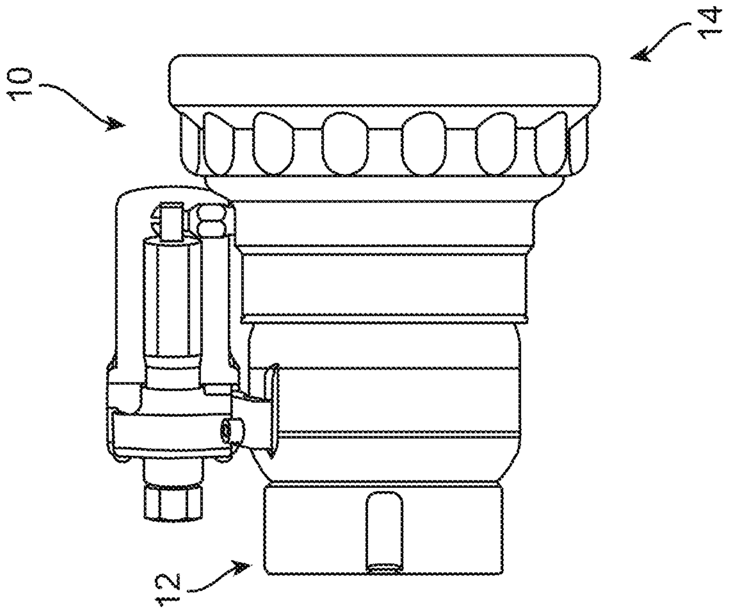
FIG. 1 (PRIOR ART)
FIG. 1 is a side view of a prior art nozzle often used as part of a pre-positioned fixed fire monitor.
Figure 3A:
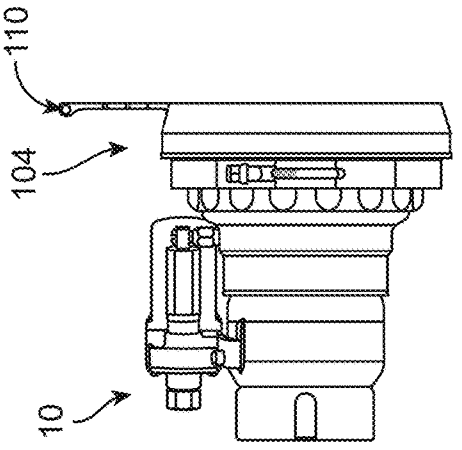
Figure 3B:
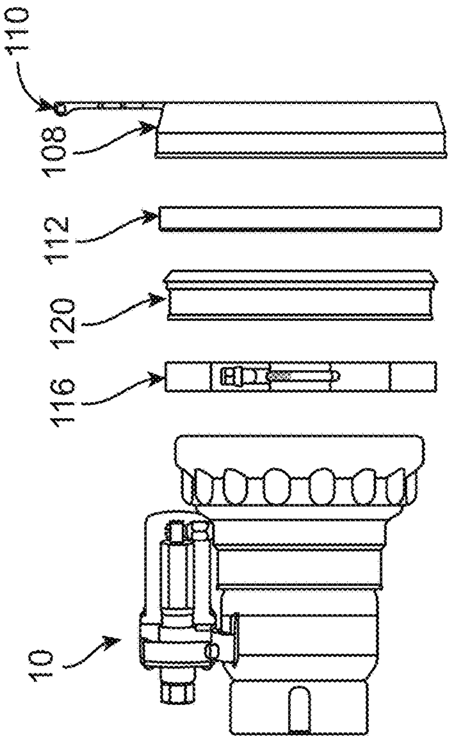
FIG. 3B is an exploded side view of the nozzle and protective covering of FIG. 3A.
Figure 4:
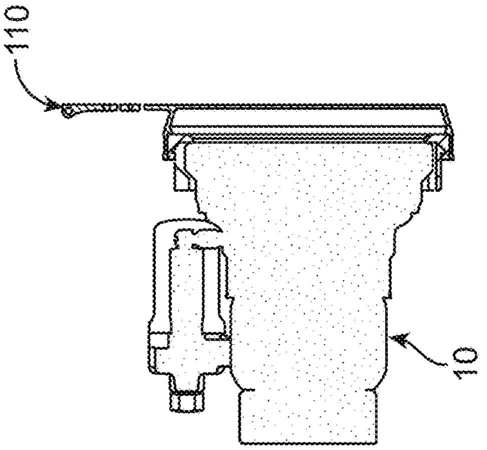
FIG. 4 is a cross-sectional view of the nozzle with protective covering of FIG. 3A.
Figure 5:
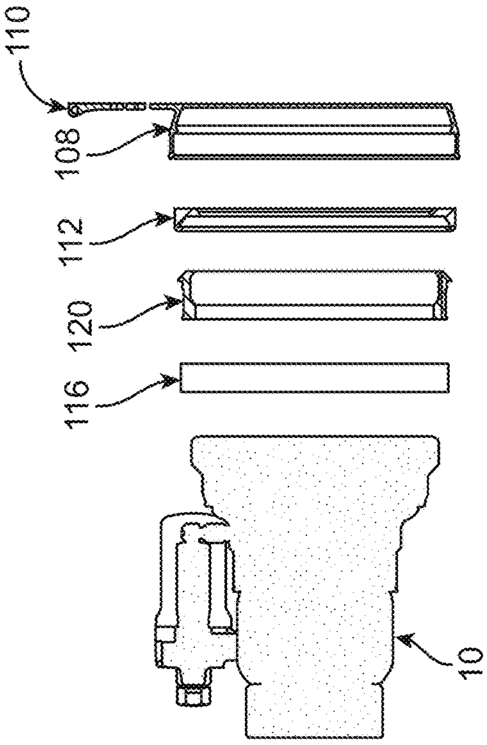
FIG. 5 is a cross-sectional view of the exploded view of FIG. 3B.

In another embodiment, a protective covering is designed to cover a nozzle, such as a nozzle 10 shown in FIG. 1 (prior art) having an inlet end 12 and a discharge end 14. As shown in FIGS. 2-6B, a protective covering 100 is provided to protect the water way of nozzle 10 that includes a water way portion 104 that has a cap 108, a lock ring 112, a clamp 116, and a flexible collar 120.

Cap 108 may be made of thermoplastic polyurethane, rubber or similar suitable materials. Cap 108 covers the water way of nozzle 10 to prevent outside materials from entering and is sized to engage with the outside exterior diameter of lock ring 112 such that cap 108 is secured to lock ring 108 under conditions experienced in the field but be released by the force exerted when nozzle 10 is discharged. The interior geometry of cap 108 may thus include a bead within the inside edge of cap 108 configured to ride over another bead that rests on top of lock ring 112. These two ring beads allow cap 108 to be held securely on ring lock 112 (see FIG. 6B). Other securement mechanisms may be used. The collar/cap interface is preferably designed to disengage at 40 PSI of either air or water pressure exerted on the nozzle-facing surface of cap 108. The outer edge or other part of cap 108 may include a reflective tape 124 that increases the visibility of the nozzle to assist with ascertaining whether the orientation of the nozzle is correctly aimed.

The two-piece collar, i.e., lock ring 112 and flexible collar 120, forms a platform for cap 108 to be attached to on the discharge end 14 of nozzle 10. Lock ring 112, an example of which is shown in more detail in FIGS. 12A-12D, may be made of hard-plastic or similar material formed in a desired size to fit over the discharge end of a nozzle to be covered. A rear face portion 128 of lock ring 112 has an inner diameter that is slightly smaller than the diameter at the discharge end 14 of nozzle 10, such as ¼ inch smaller, so that lock ring 112 engages with and cannot be pulled past the nozzle face. This configuration provides for an engagement between rear face portion 128 and the outer face of nozzle 10 that allows lock ring 112 to be held tight on to the outer nozzle face when clamp pressure is applied via engagement with flexible collar 120 as described below.

Figure 6B:
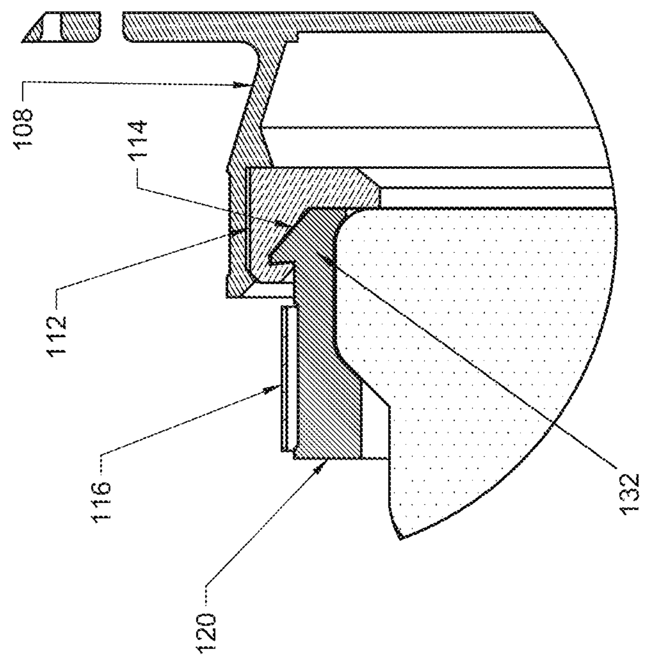
FIGS. 6A and 6B show a detail view of a portion of the cross-sectional view of the nozzle with protective covering.
Figure 6A:
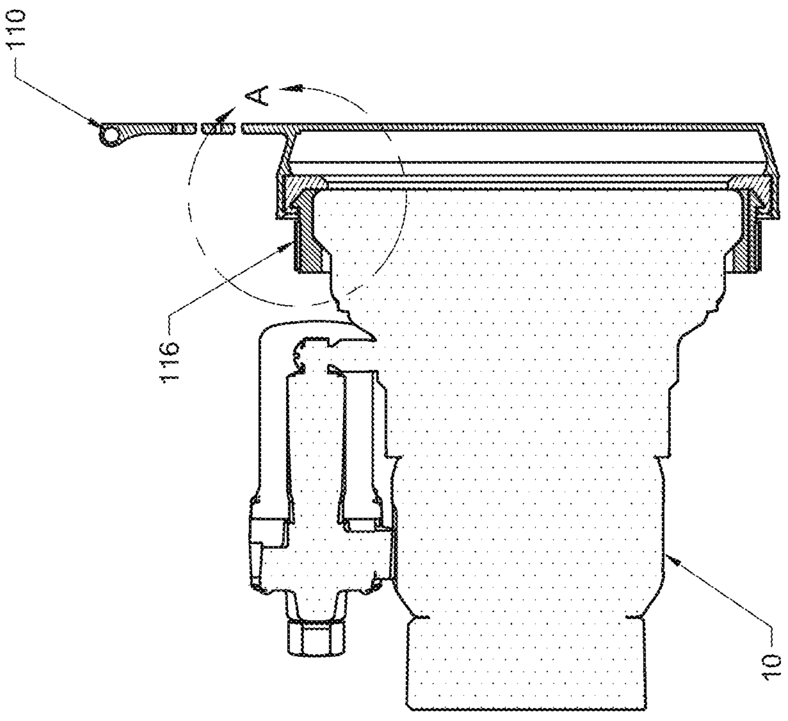

Lock ring 112 includes a flexible collar receiving portion 114 that is directed away from the discharge end of nozzle 10 when on the nozzle and is configured to receive a portion of flexible collar 120 such that lock ring 112 and flexible collar 120 are secured to one another when the portion of flexible collar 120 is engaged with the flexible collar receiving portion 114. For example, a groove geometry of flexible collar receiving portion 114 may be configured to mate with a counterpart geometry of a forward facing portion 132 of flexible collar 120, as can be seen in FIG. 6B, for example.

Figure 7A:
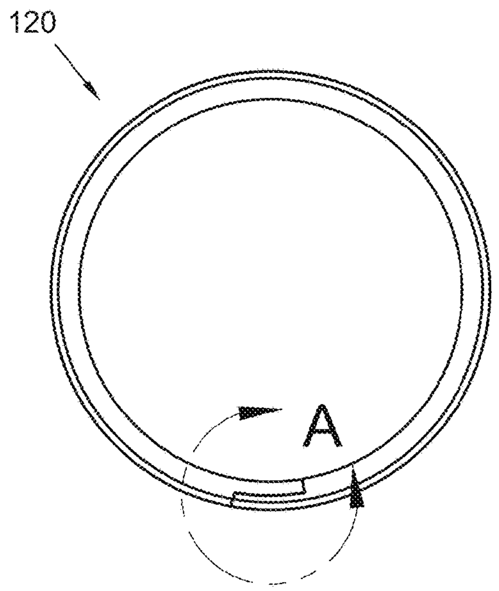
FIG. 7A is a front view of a flexible collar of a protective covering of the present disclosure.
Figure 7B:
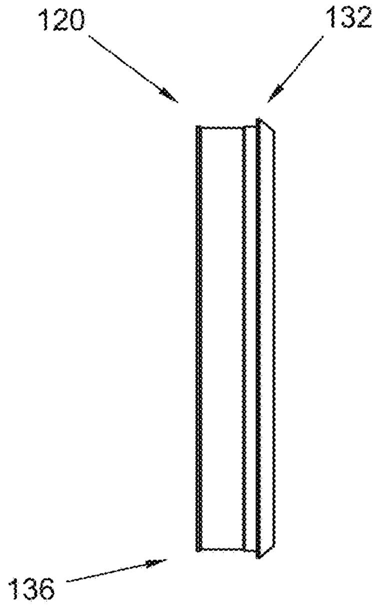
FIG. 7B is side view of the flexible collar shown in FIG. 7A.
Figure 7C:
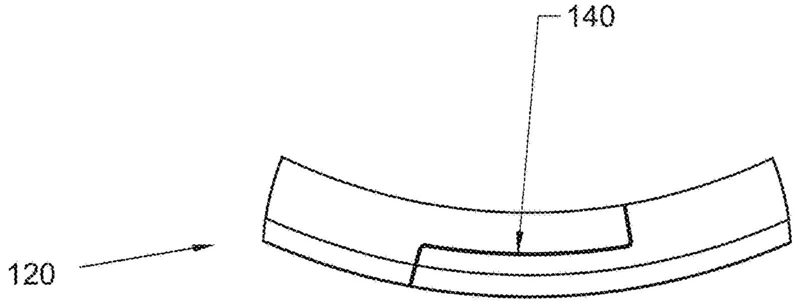
FIG. 7C is a detail view of a portion of the flexible collar of FIG. 7A.
Figure 9:
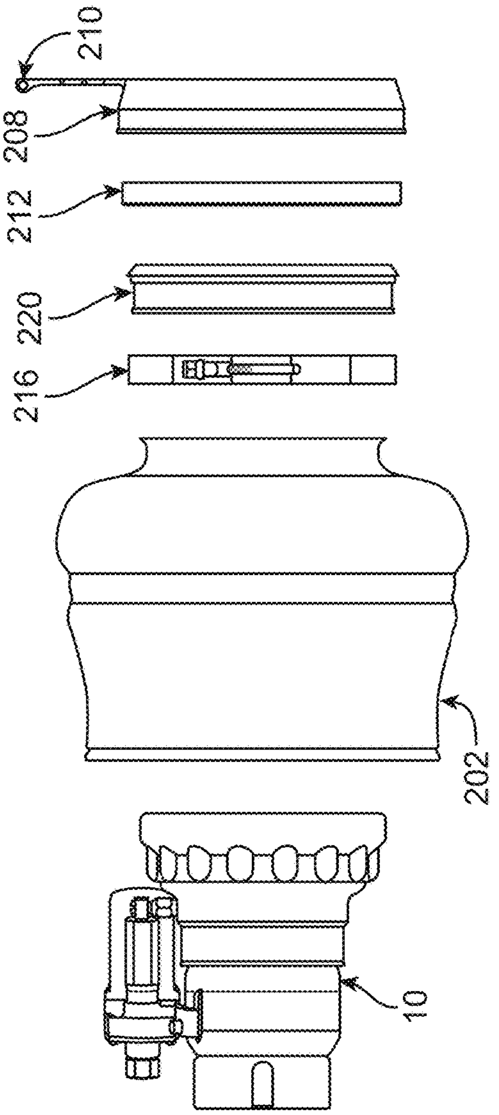
FIG. 9 is an exploded side view of the nozzle and protective covering of FIG. 8.
Figure 11:
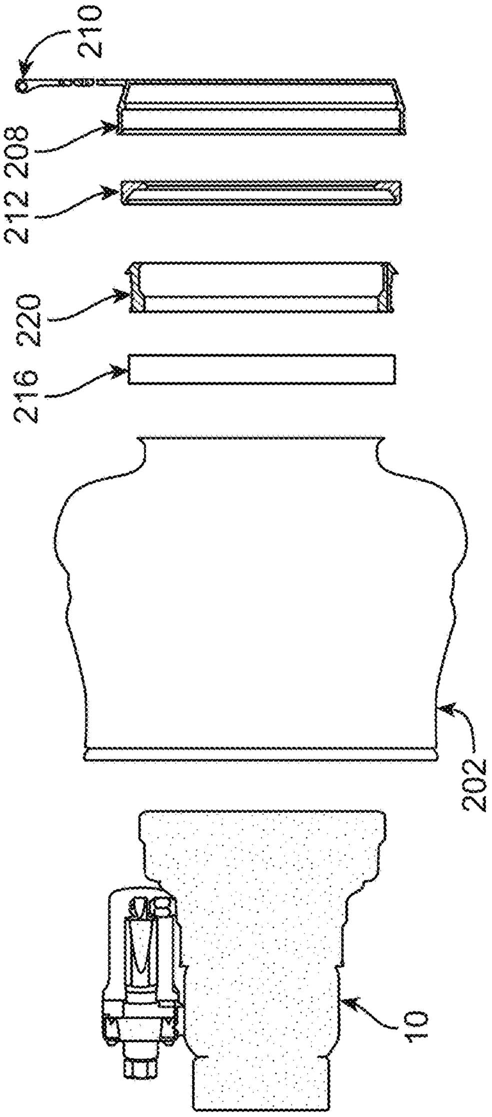
FIG. 11 is a cross-sectional view of the exploded view of FIG. 9.
Figure 8:
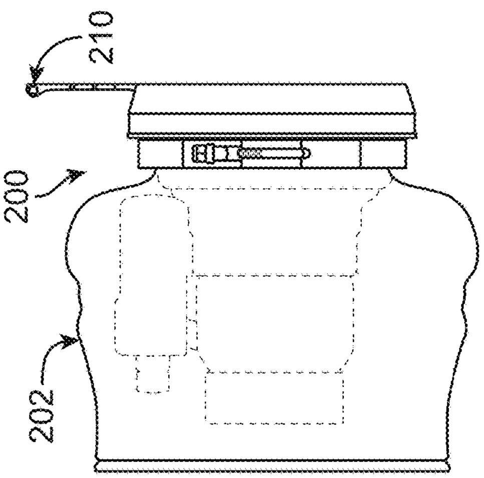
FIG. 8 is a side view of a nozzle with a protective covering in accordance with another embodiment of the present disclosure.
Figure 10:
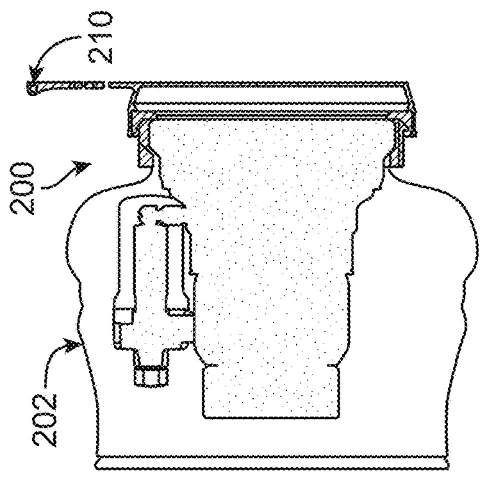
FIG. 10 is a cross-sectional view of the nozzle with protective covering of FIG. 8.
Figure 12B:
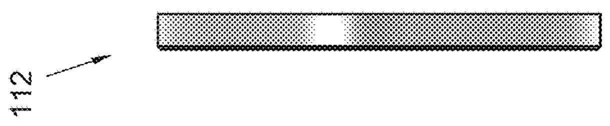
FIG. 12B is a side view of the lock ring of FIG. 12A.
Figure 12D:
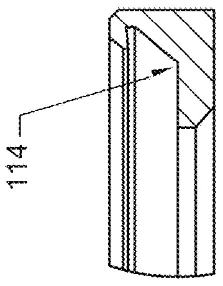
FIG. 12D is a detail view of a portion of FIG. 12C.
Figure 12A:
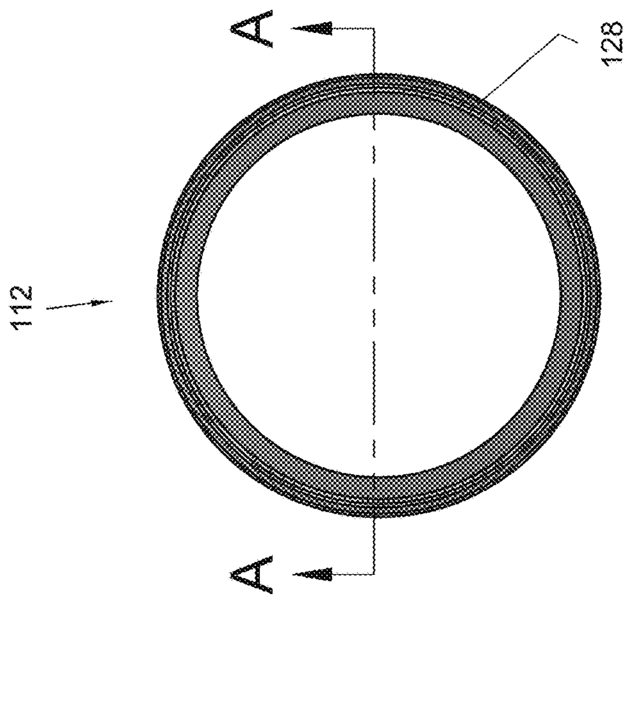
FIG. 12A is a rear view of a lock ring component of a protective covering of the present disclosure.
Figure 12C:
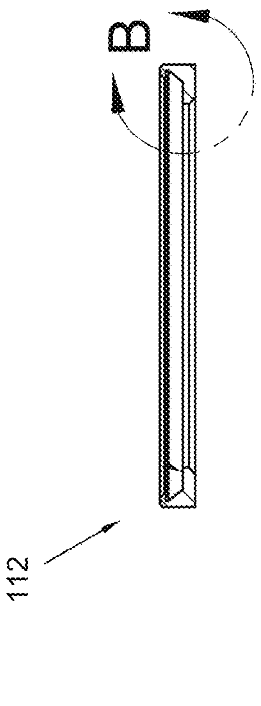
FIG. 12C is a section view of the lock ring of FIG. 12A.

Flexible collar 120 may be made of a flexible material such as rubber, thermoplastic polyurethane, or similar suitable material. On a rearward facing portion 136, flexible collar 120 has a geometry preferably matching the shape of nozzle 10. As can be seen in FIGS. 7A and 7C, lock ring 112 may include a split line opening 140. Split line opening 140 allows flexible collar 120 to flare apart during installation in order to be placed over the larger outer face diameter of nozzle 10, and split line opening 140 can be reconnected once in place. With flexible collar 120 around nozzle 10, clamp 116 is placed over it and tightened.

To install protective covering 100 over nozzle 10, flexible collar 120 is placed over nozzle 10 and then lock ring 104 is placed on the front face of nozzle 10 and onto flexible collar 120 such that flexible collar receiving portion 114 engages with forward facing portion 132. At this point, clamp 116 is tightened, which tends to strengthen the engagement between lock ring 104 and flexible collar 120 and draws lock ring 104 back securely on to the front edge of the discharge end of nozzle 10. Cap 108 is then placed onto lock ring 104 and is held in place via the engagement between lock ring 112 and cap 108 at a predetermined disengagement threshold, such as 40 PSI, so that cap 108 will be released from lock ring 104 when nozzle 10 discharges. Preferably, a tether 110 is attached to cap 108 at one end and to nozzle 10 or another component, such as clamp 116, at the other end.

Turning to FIGS. 8-11, in another embodiment, a protective covering is designed to cover a nozzle, such as nozzle 10. A protective covering 200 is provided to protect nozzle 10 that includes a body cover portion 202 and a water way portion 204 that has a cap 208, a lock ring 212, a clamp 216, and a flexible collar 220.

Cap 208 may be made of thermoplastic polyurethane, rubber or similar suitable materials. Cap 208 covers the water way of nozzle 10 to prevent outside materials from entering and is sized to engage with the outside exterior diameter of collar ring 212 such that cap 208 is secured to lock ring 208 under conditions experienced in the field but be released by the force exerted when nozzle 10 is discharged. The interior geometry of cap 208 may thus include a bead within the inside edge of cap 208 configured to ride over another bead that rests on top of lock ring 212. These two ring beads allow cap 208 to be held securely on ring lock 212. The collar/cap interface is preferably designed to disengage at 40 PSI of either air or water pressure exerted on the nozzle-facing surface of cap 208. The outer edge or other part of cap 208 may include a reflective tape that increases the visibility of the nozzle to assist with ascertaining whether the orientation of the nozzle is correctly aimed.

The two-piece collar, i.e., lock ring 212 and flexible collar 220, forms a platform for cap 208 on the discharge end of nozzle 10. Lock ring 212 may be made of hard-plastic or similar material formed in a desired size. A front face portion of lock ring 212 has an inner diameter that is slightly smaller than the diameter of nozzle 10, such as ¼ inch smaller, so that lock ring 212 cannot be pulled past the nozzle face. In addition, the engagement between the front face portion and the outer face of nozzle 10 allows lock ring 212 to be held tight on to the outer nozzle face when clamp pressure is applied via engagement with flexible collar 220.

Lock ring 212 includes a flexible collar receiving portion that faces nozzle 10 and is configured to receive a portion of flexible collar 220. For example, a groove geometry of the flexible collar receiving portion may be configured to mate with a counterpart geometry of an forward facing portion of flexible collar 220.

Flexible collar 220 may be made of a flexible material such as rubber, thermoplastic polyurethane, or similar suitable material. On a rearward facing portion, flexible collar 220 has a geometry matching the shape of nozzle 10. Lock ring 216 may include a split line opening. Split line opening allows flexible collar 220 to flare apart during installation in order to be placed over the larger outer face diameter of nozzle 10. With flexible collar 220 around nozzle 10, clamp 216 is placed over it and tightened.

Figure 13:
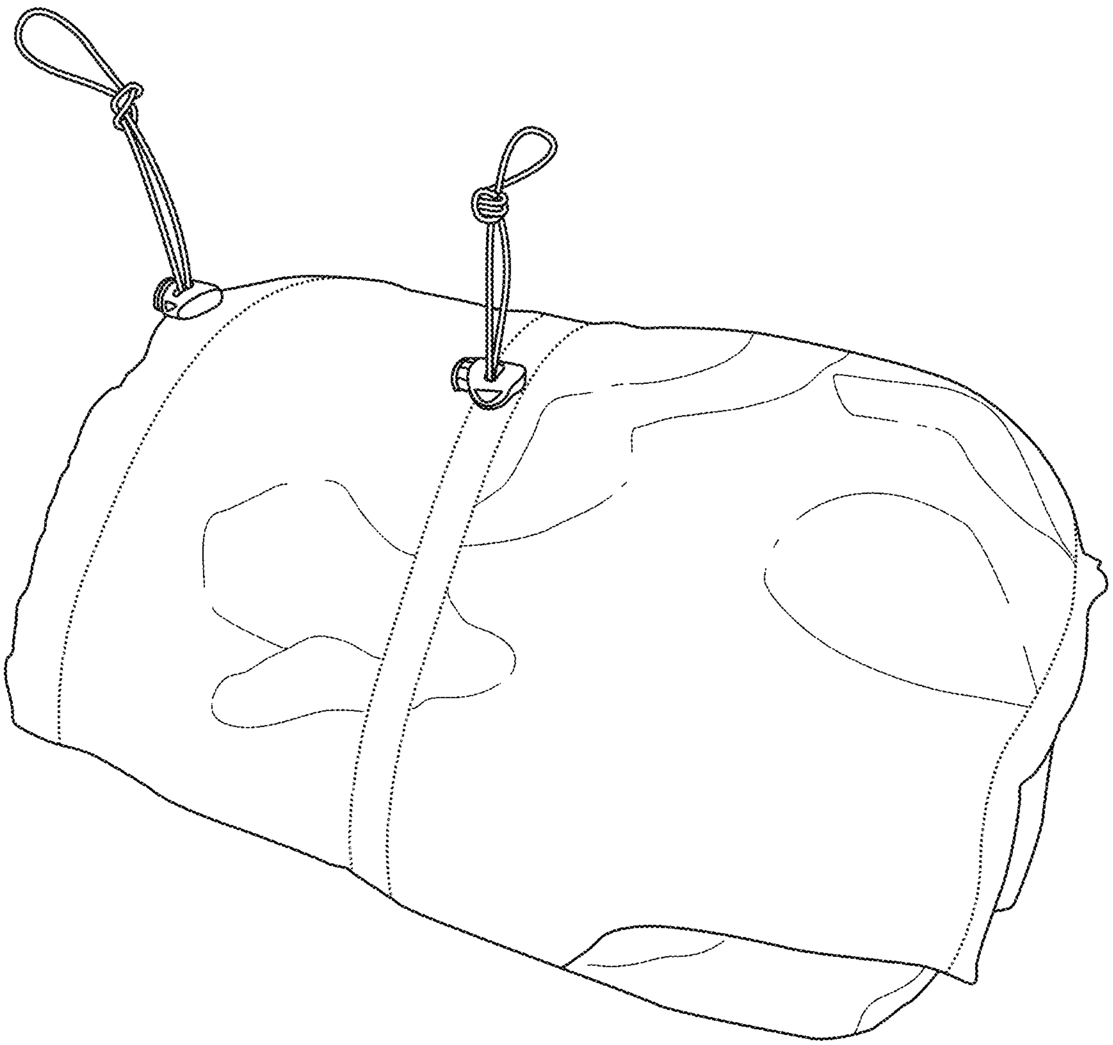
FIG. 13 is a perspective view of a body covering for a nozzle.

Covering 202, an example of which is shown in FIG. 13, may be a fabric cover body configured to cover the body of nozzle 10. Covering 202 may include two layers of fabric. A top or outer layer is selected for strength and tear resistance, and may be a 400/300 Denier nylon/polyester rip stop. The bottom or inner layer is a waterproof fabric that is UV resistant. The two layers may be sewn together to form a single sheet of two-ply fabric, which may be sewn along an edge to form a tube shape. In a preferred embodiment, one end of the tube shape is pleated to reduce the size of the fabric ring diameter to 1¼ inches larger than flexible collar 220. Covering 202 is attached to flexible collar 202 by spreading flexible collar 220 open while sewing or otherwise attaching to accommodate the larger diameter of covering 202. This extra fabric allows flexible collar 220 to expand briefly while installation takes place.

To install protective covering 200 over nozzle 10, flexible collar 220, with covering 202 attached, is placed over nozzle 10 and then lock ring 212 is placed on the front face of nozzle 10 and onto flexible collar 220 such that the flexible collar receiving portion engages with the forward facing portion. At this point, clamp 216 is tightened, which tends to strengthen the engagement between lock ring 212 and flexible collar 220 and draws lock ring 212 back securely on to the front ring edge of nozzle 10. Cap 208 is then placed onto lock ring 212 and is held in place at a predetermined disengagement threshold, such as 40 PSI, so that cap 208 will be released from lock ring 212 when nozzle 10 discharges.

Covering 202 covers to entire nozzle body and may be tied down on to both the body of nozzle 10 and to the nozzle's end via drawstrings through drawstring channels that are sewn into covering 202 with a draw cord with locking clip attached to the channels for a secure fit.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A protection system for a nozzle having a body with an inlet end and a discharge end with an opening, the opening including an outer nozzle opening surface having an outer diameter, comprising:

a flexible collar sized and configured to fit around a portion of the body at the discharge end and including a collar engagement member on an end facing the discharge end when the flexible collar is on the body;

a lock ring sized and configured to fit over the discharge end and a portion of the flexible collar, the lock ring including a receptor configured to receive the collar engagement member;

a clamp sized to fit around the flexible collar when the flexible collar is on the body and configured to tighten the flexible collar onto the body; and a cap sized and configured to cover the opening and be releasably attached to the lock ring and disengage from the lock ring when a threshold pressure is exerted on a nozzle-facing surface of the cap from the discharge end, wherein the lock ring is configured to remain attached to the body when the cap disengages when the threshold pressure is exerted.

2. The protection system of claim 1, further including a fabric covering having a first end attached to the flexible collar and configured to extend over the body.

3. The protection system of claim 1, wherein the threshold pressure is 40 PSI.

4. The protection system of claim 1, wherein the cap includes a reflective portion.

5. The protection system of claim 1, wherein the flexible collar includes a split line.

6. The protection system of claim 1, wherein the lock ring includes an inner surface configured to engage with the outer nozzle opening surface and wherein the inner surface includes an inner surface inner diameter that is smaller than the outer diameter of the outer nozzle opening surface.

7. The protection system of claim 6, wherein the inner surface inner diameter is one-quarter inch less than the outer diameter of the outer nozzle opening surface.

8. The protection system of claim 1, wherein the cap includes a cap bead within an inside edge configured to engage with a lock ring bead when the cap is secured to the lock ring.

9. The protection system of claim 2, wherein the fabric covering includes an outer layer and an inner layer, wherein the outer layer is a tear resistant material and the inner layer is waterproof and UV resistant.

10. The protection system of claim 6, wherein the flexible collar is configured such that, when the clamp is tightened over the flexible collar, engagement between the portion of the flexible collar and the inner surface of the lock ring exerts a force on the outer nozzle opening surface.

11. A method of protecting a nozzle having a body with an inlet end and a discharge end with an opening, the opening including an outer nozzle opening surface having an outer diameter, comprising:

placing a flexible collar around a portion of the body at the discharge end, wherein the flexible collar includes a collar engagement member on an end facing the discharge end;

placing a lock ring over the discharge end and a portion of the flexible collar, wherein the lock ring includes a receptor that engages with the collar engagement member;

tightening a clamp around the flexible collar such that the flexible collar is secured to the body; and attaching a cap to the lock ring, wherein the cap covers the opening and is attached to the lock ring such that the cap disengages from the lock ring when a threshold pressure is exerted from the discharge end on a nozzle-facing surface of the cap;

wherein the lock ring is configured to remain attached to the body when the cap disengages when the threshold pressure is exerted.

12. The method of claim 11, further including attaching a first end of a covering to the flexible collar and extending the covering over the body.

13. The method of claim 11, wherein the threshold pressure is 40 PSI.

14. The method of claim 11, wherein the flexible collar includes a split line and wherein placing the flexible collar around the portion of the body at the discharge end includes opening the flexible collar at the split line.

15. The method of claim 11, wherein the lock ring includes an inner surface configured to engage with the outer nozzle opening surface and wherein the inner surface includes an inner surface inner diameter that is smaller than the outer diameter of the outer nozzle opening surface.

16. The method of claim 15, wherein the inner surface inner diameter is one-quarter inch less than the outer diameter of the outer nozzle opening surface.

17. The method of claim 11, wherein the cap includes a cap bead within an inside edge configured to engage with a lock ring bead when the cap is secured to the lock ring.

18. The method of claim 12, wherein the covering includes an outer layer and an inner layer, wherein the outer layer is a tear resistant material and the inner layer is waterproof and UV resistant.

19. The method of claim 15, wherein tightening the clamp causes the inner surface of the lock ring exerting a force on the outer nozzle opening surface.

* * * * *